(12) United States Patent
Kim et al.

(10) Patent No.: US 10,579,190 B2
(45) Date of Patent: Mar. 3, 2020

(54) TOUCH DETECTOR, TOUCH DETECTION CHIP AND TOUCH INPUT DEVICE

(71) Applicant: HiDeep Inc., Gyeonggi-do (KR)

(72) Inventors: Bonkee Kim, Gyeonggi-do (KR); Seyeob Kim, Gyeonggi-do (KR)

(73) Assignee: HIDEEP INC., Gyeonggi-Do (KR)

( * ) Notice: Subject to any disclaimer, the term of this patent is extended or adjusted under 35 U.S.C. 154(b) by 329 days.

(21) Appl. No.: 15/225,097

(22) Filed: Aug. 1, 2016

(65) Prior Publication Data
US 2017/0038869 A1    Feb. 9, 2017

(30) Foreign Application Priority Data

Aug. 3, 2015 (KR) .......................... 10-2015-0109385

(51) Int. Cl.
*G06F 3/044* (2006.01)
*G06F 3/041* (2006.01)

(52) U.S. Cl.
CPC ............ *G06F 3/044* (2013.01); *G06F 3/0414* (2013.01)

(58) Field of Classification Search
CPC ....................................................... G06F 3/044
See application file for complete search history.

(56) References Cited

U.S. PATENT DOCUMENTS

| | | | | |
|---|---|---|---|---|
| 9,405,414 B2* | 8/2016 | Ahn | .......... | G06F 3/044 |
| 2015/0062068 A1* | 3/2015 | Shih | .......... | G06F 3/044 |
| | | | | 345/174 |
| 2015/0123940 A1* | 5/2015 | Park | .......... | G06F 3/0416 |
| | | | | 345/174 |
| 2015/0153942 A1 | 6/2015 | Kim et al. | | |
| 2015/0160778 A1 | 6/2015 | Kim et al. | | |
| 2016/0026315 A1* | 1/2016 | Choi | .......... | G06F 3/0414 |
| | | | | 345/174 |
| 2016/0117019 A1* | 4/2016 | Takeda | .......... | G06F 3/03 |
| | | | | 345/174 |

FOREIGN PATENT DOCUMENTS

| | | |
|---|---|---|
| JP | 2014-191779 A | 10/2014 |
| KR | 10-2010-0101773 A | 9/2010 |
| KR | 10-1506511 B1 | 4/2015 |
| KR | 10-2015-0066885 A | 6/2015 |
| WO | WO 2014/035479 A2 | 3/2014 |
| WO | WO 2015/047374 A1 | 4/2015 |

OTHER PUBLICATIONS

Office Action dated Jun. 6, 2017 in related Japanese Appl. 2016-151406 (2 pgs.).

(Continued)

*Primary Examiner* — Nelson M Rosario
*Assistant Examiner* — Scott Au
(74) *Attorney, Agent, or Firm* — Foley & Lardner LLP

(57) ABSTRACT

A touch detection chip may be provided that includes: a drive unit which applies a drive signal to at least two of a plurality of electrodes; a sensing unit which receives a plurality of signals from the at least two of the plurality of electrodes and detects a touch position and a touch pressure; and a plurality of input terminals for receiving the plurality of signals. At least one of the plurality of input terminals is a pressure detection input terminal.

18 Claims, 9 Drawing Sheets

(56) References Cited

OTHER PUBLICATIONS

Extended European Search Report dated Dec. 2, 2016 in related European Appl. 16 181 901.6 (8 pgs.).
Office Action dated Jun. 15, 2016 in related Korean Appl. 10-2015-0109385 (5 pgs.).
Office Action dated Jan. 11, 2018 in related European Appl. 16 181 901.6 (7 pgs.).
Office Action dated Mar. 20, 2018 in related Japanese Appl. 2016-151406 (2 pgs.).
Office Action dated Aug. 2, 2019 in related Chinese Appl. 201610617884.4 with English translation (27 pgs).

* cited by examiner

[Fig. 1]
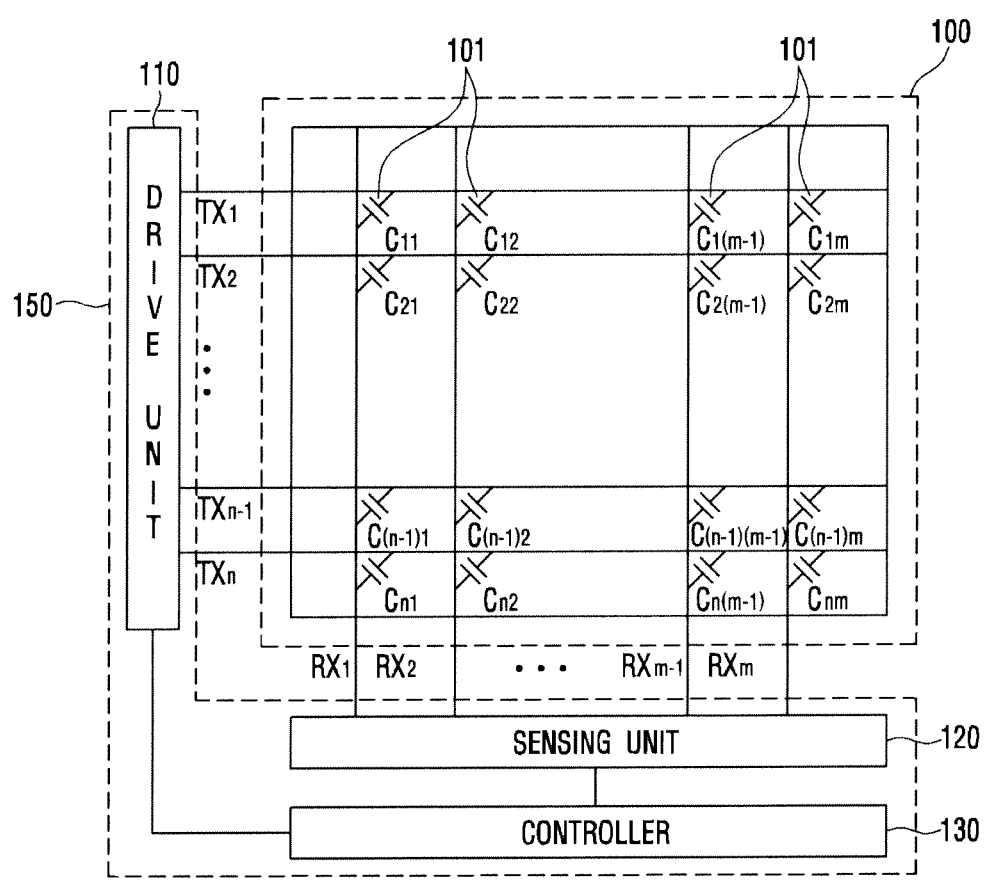

[Fig. 2a]
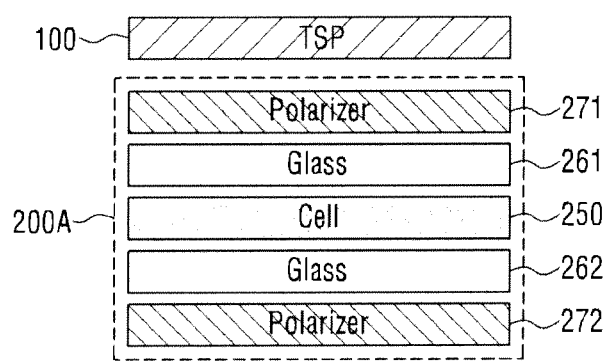
[Fig. 2b]
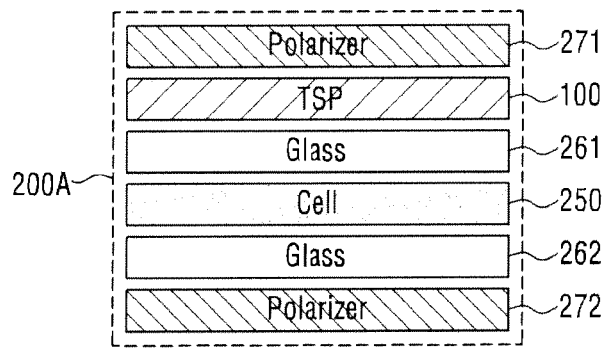

[Fig. 2c]
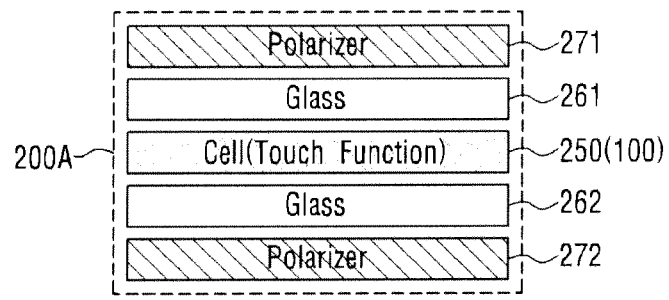
[Fig. 3a]
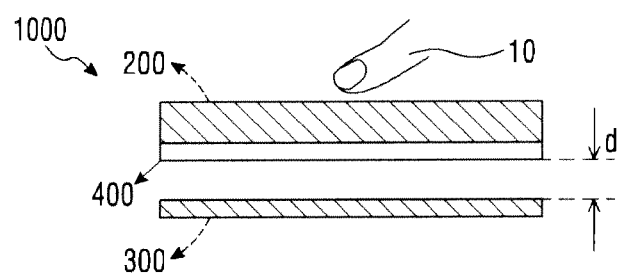
[Fig. 3b]
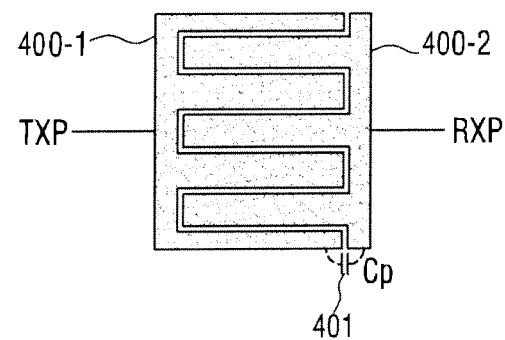

[Fig. 4]
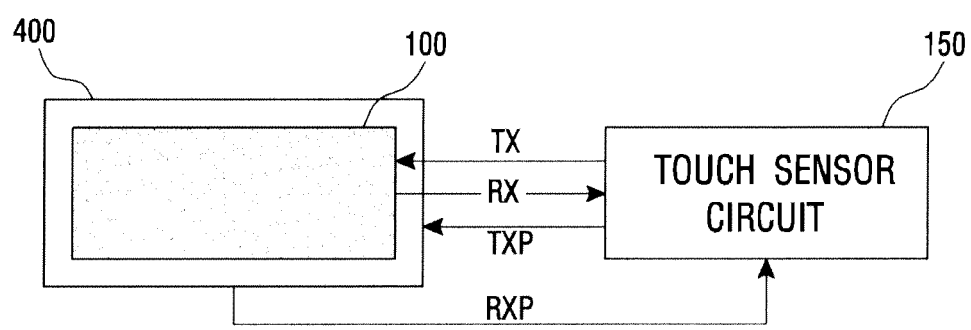

[Fig. 5]
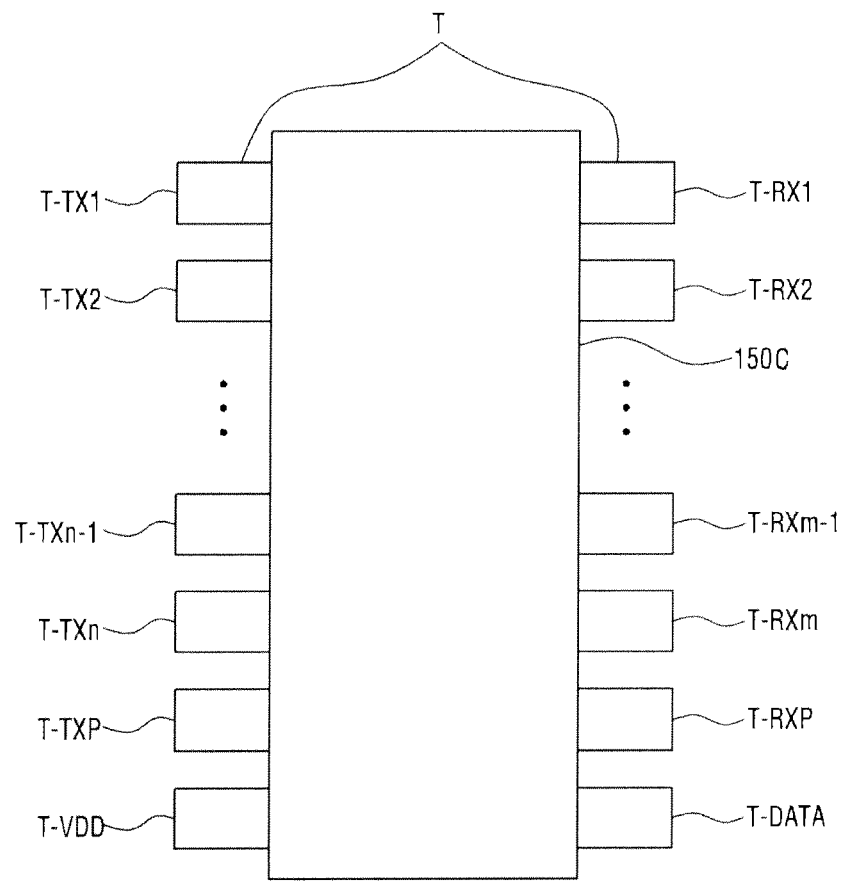

[Fig. 6]
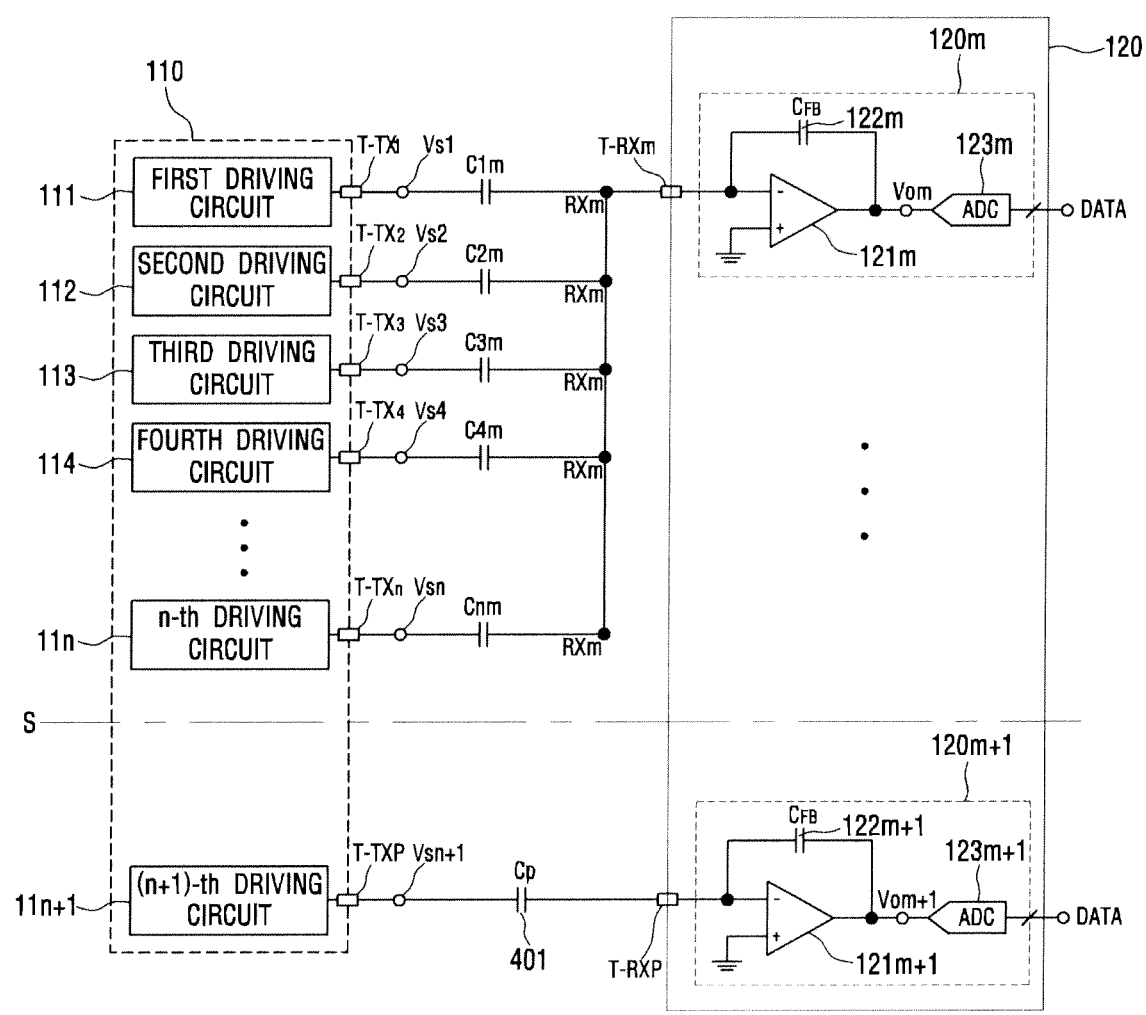

【Fig. 7】
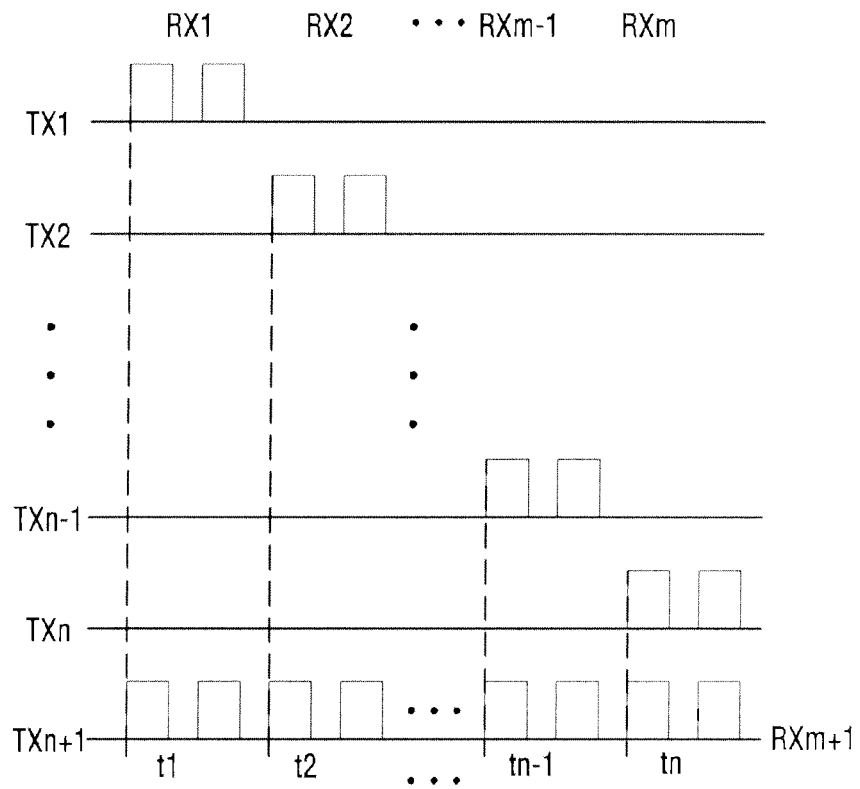
【Fig. 8a】
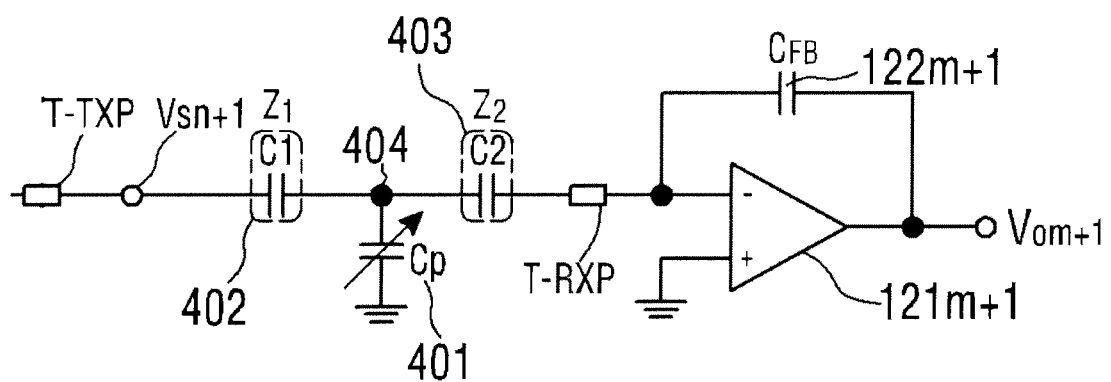

[Fig. 8b]
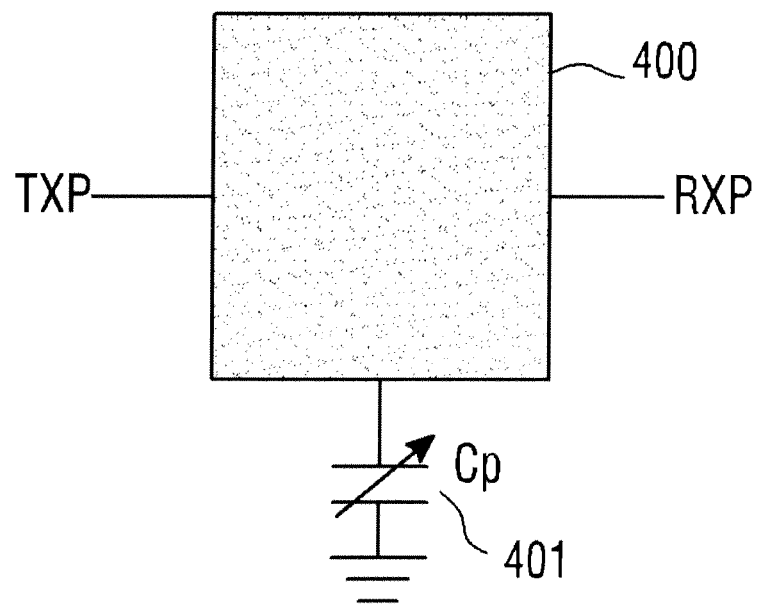
[Fig. 8c]
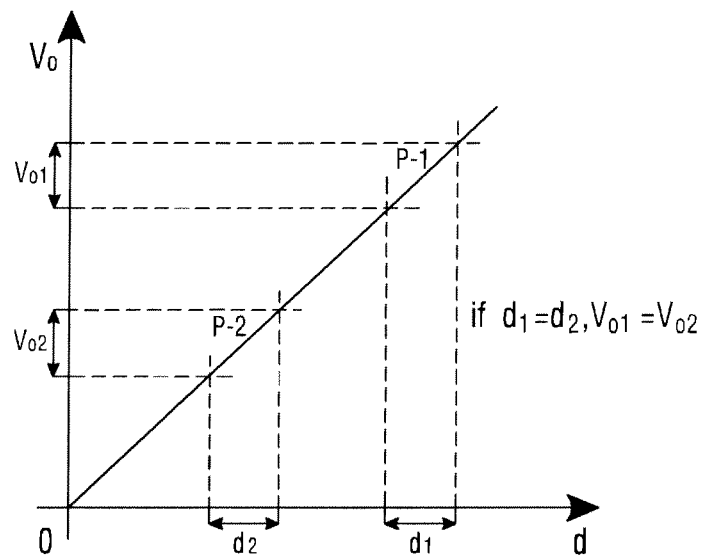

[Fig. 9]
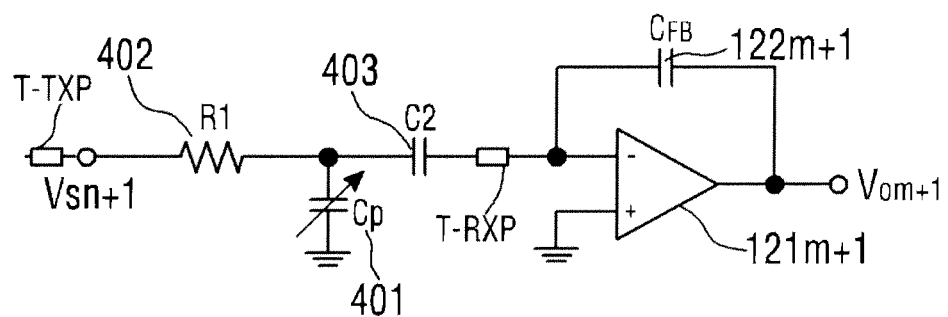

TOUCH DETECTOR, TOUCH DETECTION CHIP AND TOUCH INPUT DEVICE

BACKGROUND

Field

The present disclosure relates to a touch detector, a touch detection chip, and a touch input device, and more particularly to a touch detector capable of detecting a touch position and a touch pressure, a touch detection chip, and a touch input device including the touch detector and the touch detection chip.

Description of the Related Art

Various kinds of input devices are being used to operate a computing system. For example, the input device includes a button, key, joystick and touch screen. Since the touch screen is easy and simple to operate, the touch screen is increasingly being used in operation of the computing system.

The touch screen may constitute a touch surface of a touch input device including a touch sensor panel which may be a transparent panel including a touch-sensitive surface. The touch sensor panel is attached to the front side of a display screen, and then the touch-sensitive surface may cover the visible side of the display screen. The touch screen allows a user to operate the computing system by simply touching the touch screen by a finger, etc. Generally, the computing system recognizes the touch and the touch position on the touch screen and analyzes the touch, and thus, performs the operations in accordance with the analysis.

In addition to this, researches are being continuously conducted to detect not only the touch position but also a touch pressure on the touch surface of the touch input device. Here, since a configuration for detecting the touch position on the touch sensor panel and a configuration for detecting the touch pressure from the pressure electrode should be separately manufactured, the manufacturing cost thereof are increased and the manufacturing process thereof becomes more complex. Moreover, these configurations occupy a greater volume and consume a greater area in the touch input device.

SUMMARY

One embodiment is a touch detection chip that includes: a drive unit which applies a drive signal to at least two of a plurality of electrodes; a sensing unit which receives a plurality of signals from the at least two of the plurality of electrodes and detects a touch position and a touch pressure; and a plurality of input terminals for receiving the plurality of signals. At least one of the plurality of input terminals is a pressure detection input terminal.

Another embodiment is a touch detector that includes: a drive unit which applies a drive signal to at least two of a plurality of electrodes; and a sensing unit which receives a plurality of signals from the at least two of the plurality of electrodes and detects a touch position and a touch pressure. At least one of the at least two electrodes to which the drive signal is applied is a pressure detection drive electrode. At least one of the at least two electrodes for receiving the plurality of signals is a pressure detection receiving electrode.

Further another embodiment is a touch input device that includes: a plurality of electrodes; and a touch detection chip. The touch detection chip includes: a drive unit which applies a drive signal to at least two of the plurality of electrodes; a sensing unit which receives a plurality of signals from the at least two of the plurality of electrodes and detects a touch position and a touch pressure; and a plurality of input terminals for receiving the plurality of signals. At least one of the plurality of input terminals is a pressure detection input terminal.

BRIEF DESCRIPTION OF THE DRAWINGS

FIG. 1 is a schematic view of a configuration of a capacitance type touch sensor panel and the operation thereof in accordance with an embodiment of the present invention;

FIGS. 2a, 2b and 2c are conceptual views showing a relative position of the touch sensor panel with respect to a display module in a touch input device according to the embodiment;

FIG. 3a is a cross sectional view of the touch input device to which a pressure electrode according to the embodiment has been applied;

FIG. 3b shows a structure of the pressure electrode according to the embodiment; FIG. 4 is a conceptual view showing a signal transmission among a touch detector, the touch sensor panel, and the pressure electrode in accordance with the embodiment;

FIG. 5 shows a touch detection chip according to the embodiment;

FIG. 6 shows an equivalent circuit showing connection relationships among a drive unit, a sensing unit, and electrodes of the touch input device according to the embodiment;

FIG. 7 shows a drive signal which is applied from the drive unit of the touch detector according to the embodiment to the electrodes;

FIGS. 8a to 8c show respectively an equivalent circuit of the pressure electrode and the sensing unit, a structure of the pressure electrode, and a graph showing an output signal of the sensing unit, based on a change of a distance between the pressure electrode and a reference potential layer in accordance with a first alternative example of the touch input device according to the embodiment; and FIG. 9 show an equivalent circuit of the pressure electrode and the sensing unit in accordance with a second alternative example of the touch input device according to the embodiment.

DETAILED DESCRIPTION

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. Similar reference numerals in the drawings designate the same or similar functions in many aspects.

Hereinafter, a touch detector, a touch detection chip, and a touch input device according to the embodiment of the present invention will be described with reference to the accompanying drawings. Hereinafter, a method for detecting a capacitive touch position and a capacitive touch pressure will be described. However, as long as the touch detector capable of detecting the touch position and the touch pressure in any manner, the touch detection chip, and the touch input device are within the scope and spirit disclosed in the embodiment of the present invention, they may be included in the scope of the present invention.

FIG. 1 is a schematic view of a configuration of a capacitance type touch sensor panel and of operations of the same. Referring to FIG. 1, a touch sensor panel 100 according to the embodiment may include a plurality of drive electrodes TX1 to TXn and a plurality of receiving electrodes RX1 to RXm. The touch sensor panel 100 may include a drive unit 110 which applies a drive signal to the plurality of drive electrodes TX1 to TXn for the purpose of the operation of the touch sensor panel 100, and a sensing unit 120 which detects whether the touch has occurred or not and the touch position by receiving a signal including information on the capacitance change amount changing according to the touch on the touch surface of the touch sensor panel 100.

As shown in FIG. 1, the touch sensor panel 100 may include the plurality of drive electrodes TX1 to TXn and the plurality of receiving electrodes RX1 to RXm. While FIG. 1 shows that the plurality of drive electrodes TX1 to TXn and the plurality of receiving electrodes RX1 to RXm of the touch sensor panel 100 form an orthogonal array, the present invention is not limited to this. The plurality of drive electrodes TX1 to TXn and the plurality of receiving electrodes RX1 to RXm has an array of arbitrary dimension, for example, a diagonal array, a concentric array, a 3-dimensional random array, etc., and an array obtained by the application of them. Here, "n" and "m" are positive integers and may be the same as each other or may have different values. The magnitude of the value may be changed depending on the embodiment.

As shown in FIG. 1, the plurality of drive electrodes TX1 to TXn and the plurality of receiving electrodes RX1 to RXm may be arranged to cross each other. The drive electrode TX may include the plurality of drive electrodes TX1 to TXn extending in a first axial direction. The receiving electrode RX may include the plurality of receiving electrodes RX1 to RXm extending in a second axial direction crossing the first axial direction.

In the touch sensor panel 100 according to the embodiment of the present invention, the plurality of drive electrodes TX1 to TXn and the plurality of receiving electrodes RX1 to RXm may be formed in the same layer. For example, the plurality of drive electrodes TX1 to TXn and the plurality of receiving electrodes RX1 to RXm may be formed on the same side of an insulation layer (not shown). Also, the plurality of drive electrodes TX1 to TXn and the plurality of receiving electrodes RX1 to RXm may be formed in different layers. For example, the plurality of drive electrodes TX1 to TXn and the plurality of receiving electrodes RX1 to RXm may be formed on both sides of one insulation layer (not shown) respectively, or the plurality of drive electrodes TX1 to TXn may be formed on a side of a first insulation layer (not shown) and the plurality of receiving electrodes RX1 to RXm may be formed on a side of a second insulation layer (not shown) different from the first insulation layer.

The plurality of drive electrodes TX1 to TXn and the plurality of receiving electrodes RX1 to RXm may be made of a transparent conductive material (for example, indium tin oxide (ITO) or antimony tin oxide (ATO) which is made of tin oxide ($SnO_2$), and indium oxide ($In_2O_3$), etc.), or the like. However, this is only an example. The drive electrode TX and the receiving electrode RX may be also made of another transparent conductive material or an opaque conductive material. For instance, the drive electrode TX and the receiving electrode RX may include at least any one of silver ink, copper, and carbon nanotube (CNT). Also, the drive electrode TX and the receiving electrode RX may be made of metal mesh or nano silver.

The drive unit 110 according to the embodiment of the present invention may apply the drive signal to the drive electrodes TX1 to TXn. In the embodiment of the present invention, one drive signal may be sequentially applied at a time to the first drive electrode TX1 to the n-th drive electrode TXn. The drive signal may be applied again repeatedly. This is only an example. The drive signal may be applied to the plurality of drive electrodes at the same time in accordance with the embodiment.

Through the receiving electrodes RX1 to RXm, the sensing unit 120 receives a sensing signal including information on a capacitance (Cm) 101 generated between the receiving electrodes RX1 to RXm and the drive electrodes TX1 to TXn to which the drive signal has been applied, thereby detecting whether or not the touch has occurred and where the touch has occurred. For example, the sensing signal may be a signal coupled by the capacitance (CM) 101 generated between the receiving electrode RX and the drive electrode TX to which the drive signal has been applied. As such, the process of sensing the drive signal applied from the first drive electrode TX1 to the nth drive electrode TXn through the receiving electrodes RX1 to RXm can be referred to as a process of scanning the touch sensor panel 100. The configuration and operation of the sensing unit 120 will be described in more detail with reference to FIG. 6.

A controller 130 may perform a function of controlling the operations of the drive unit 110 and the sensing unit 120. For example, the controller 130 generates and transmits a drive control signal to the drive unit 110, so that the drive signal can be applied to a predetermined drive electrode TX1 at a predetermined time. Also, the controller 130 generates and transmits the drive control signal to the sensing unit 120, so that the sensing unit 120 may receive the sensing signal from the predetermined receiving electrode RX at a predetermined time and perform a predetermined function.

As described above, a capacitance (C) with a predetermined value is generated at each crossing of the drive electrode TX and the receiving electrode RX. When an object such as finger approaches close to the touch sensor panel 100, the value of the capacitance may be changed. In FIG. 1, the capacitance may represent a mutual capacitance (Cm). The sensing unit 120 senses such electrical characteristics, thereby being able to sense whether the touch has occurred on the touch sensor panel 100 or not and where the touch has occurred. For example, the sensing unit 120 is able to sense whether the touch has occurred on the surface of the touch sensor panel 100 comprised of a two-dimensional plane consisting of a first axis and a second axis.

More specifically, when the touch occurs on the touch sensor panel 100, the drive electrode TX to which the drive signal has been applied is detected, so that the position of the second axial direction of the touch can be detected. Likewise, when the touch occurs on the touch sensor panel 100, a capacitance change is detected from a reception signal received through the receiving electrode RX, so that the position of the first axial direction of the touch can be detected.

The mutual capacitance type touch sensor panel as the touch sensor panel 100 has been described in detail in the foregoing. However, in a touch input device 1000 according to the embodiment of the present invention, the touch sensor panel 100 for detecting whether or not the touch has occurred and where the touch has occurred may be implemented by using not only the above-described method but also a touch sensing method like a self-capacitance method, a resistance film method, etc.

In the touch input device 1000 according to the embodiment of the present invention, the touch sensor panel 100 for detecting the touch position may be positioned outside or inside a display module 200.

The display module 200 of the touch input device 1000 according to the embodiment of the present invention may be a display panel included in a liquid crystal display (LCD), a plasma display panel (PDP), an organic light emitting diode (OLED), etc. Accordingly, a user may perform the input operation by touching the touch surface while visually identifying an image displayed on the display panel. Here, the display module 200 may include a configuration and/or a control circuit which receives an input from an application processor (AP) or a central processing unit (CPU) on a main board for the operation of the touch input device 1000 and displays the contents that the user wants on the display panel. Here, the control circuit for the operation of the display panel 200 may include a display panel control IC, a graphic controller IC, and other circuits required to operate the display panel 200.

FIGS. 2a, 2b and 2c are conceptual views showing a relative position of the touch sensor panel with respect to the display module in a touch input device 1000 according to the embodiment. While FIGS. 2a to 2c show an LCD panel as a display panel 200A included within the display module 200, this is just an example. Any display panel may be applied to the touch input device 1000 according to the embodiment of the present invention.

In this specification, the reference numeral 200A may designate the display panel included in the display module 200. As shown in FIG. 2, the LCD panel 200A may include a liquid crystal layer 250 including a liquid crystal cell, a first glass layer 261 and a second glass layer 262 which are disposed on both sides of the liquid crystal layer 250 and include electrodes, a first polarizer layer 271 formed on a side of the first glass layer 261 in a direction facing the liquid crystal layer 250, and a second polarizer layer 272 formed on a side of the second glass layer 262 in the direction facing the liquid crystal layer 250. It is clear to those skilled in the art that the LCD panel may further include other configurations for the purpose of performing the displaying function and may be transformed.

FIG. 2a shows that the touch sensor panel 100 of the touch input device 1000 is disposed outside the display module 200. The touch surface of the touch input device 1000 may be the surface of the touch sensor panel 100. In FIG. 2a, the top surface of the touch sensor panel 100 is able to function as the touch surface. Also, according to the embodiment, the touch surface of the touch input device 1000 may be the outer surface of the display module 200. In FIG. 2a, the bottom surface of the second polarizer layer 272 of the display module 200 is able to function as the touch surface. Here, in order to protect the display module 200, the bottom surface of the display module 200 may be covered with a cover layer (not shown) such as glass.

FIGS. 2b and 2c show that the touch sensor panel 100 of the touch input device 1000 is disposed inside the display panel 200A. Here, in FIG. 2b, the touch sensor panel 100 for detecting the touch position is disposed between the first glass layer 261 and the first polarizer layer 271. Here, the touch surface of the touch input device 1000 is the outer surface of the display module 200. The top surface or bottom surface of the display module 200 in FIG. 2b may be the touch surface. FIG. 2c shows that the touch sensor panel 100 for detecting the touch position is included in the liquid crystal layer 250. Also, according to the embodiment, the touch sensor panel 100 may be implemented such that the electrical devices for the operation of the display panel 200A are used for the touch sensing. Here, the touch surface of the touch input device 1000 is the outer surface of the display module 200. The top surface or bottom surface of the display module 200 in FIG. 2c may be the touch surface. In FIGS. 2b and 2c, the top surface or bottom surface of the display module 200, which can be the touch surface, may be covered with a cover layer (not shown) such as glass.

In the foregoing, it has been described that whether or not the touch occurs on the touch sensor panel 100 according to the embodiment of the present invention and/or the touch position are detected. Additionally, it is also possible to detect a magnitude of the touch pressure by further including a pressure electrode for detecting the touch pressure, apart from the touch sensor panel 100.

FIG. 3a is a cross sectional view of the touch input device to which a pressure electrode according to the embodiment has been applied. FIG. 3a shows a simplified physical structure in which a pressure electrode 400 detects the pressure in the touch input device 1000 in accordance with the embodiment. The pressure electrode 400 according to the embodiment may be applied to the touch input device 1000 including a reference potential layer 300 and detect the magnitude of the touch pressure which is applied to the touch input device 1000. For example, the pressure electrode 400 may be disposed separately from the reference potential layer 300 at a little distance "d". Here, a material which is deformable by the application of the pressure through an object 10 may be disposed between the pressure electrode 400 and the reference potential layer 300. For instance, the deformable material disposed between the pressure electrode 400 and the reference potential layer 300 may be air, dielectrics, an elastic body and/or a shock absorbing material.

When the object 10 presses the surface of the touch input device 1000, a distance between the pressure electrode 400 and the reference potential layer 300 is decreased in accordance with the magnitude of the pressure. The reference potential layer 300 may be any potential layer included in the touch input device 1000. In the embodiment, the reference potential layer may be a ground layer having a ground potential. In the embodiment, the reference potential layer may be a shielding layer for shielding noise.

FIG. 3b shows a structure of the pressure electrode 400 according to the embodiment. The pressure electrode 400 may include a pressure drive electrode 400-1 and a pressure receiving electrode 400-2. Referring back to FIG. 3a, as the distance "d" becomes smaller, the magnitude of a capacitance of a pressure capacitor 401 (Cp), which is formed between the pressure drive electrode 400-1 and the pressure receiving electrode 400-2 by fringing effect, may be reduced. The touch input device of FIG. 3a has a structure in which the closer the pressure electrode 400 is to the reference potential layer 300, the more a fringing field formed between the pressure drive electrode 400-1 and the pressure receiving electrode 400-2 is lost to the reference potential layer 300. Therefore, the magnitude of the capacitance of the pressure capacitor 401 may be reduced with the reduction of the distance "d".

The pressure electrode 400 according to the embodiment may be disposed at any position within the touch input device 1000. For example, in FIG. 3a, the pressure electrode 400 may be disposed under the display module 200. Here, the reference potential layer 300 may be a noise shielding layer of the display module 200. Or, the reference potential layer 300 may be a shielding layer for shielding noise generated from a central processing unit (CPU) or an application processor (AP), etc., which are positioned on a main board and is provided for the operation of the touch input device 1000. Here, the reference potential layer 300 may be a mid-frame which distinguishes between and supports the display module 200 and the main board in the touch input device 1000.

FIG. 3a shows that the pressure electrode 400 is disposed under the display module 200. This is just an example. The pressure electrode 400 may be disposed at any position spaced at a predetermined distance from the reference potential layer 300 within the touch input device 1000. Also, in the touch input device 1000, it is shown that the top surface of the display module 200 constitutes the touch surface. This is just an example. The touch surface may have any other configuration, and it is enough as long as the distance between the pressure electrode 400 and the reference potential layer 300 can change depending on the application of the pressure to the touch surface.

In addition, FIGS. 3a and 3b describe that the pressure drive electrode 400-1 and the pressure receiving electrode 400-2 are formed in the same layer and describe the structure for detecting the touch pressure on the basis of the capacitance change between the pressure drive electrode 400-1 and the pressure receiving electrode 400-2, based on the distance change between the reference potential layer 300 and the pressure electrode 400. However, this is just an example. According to the embodiment, the pressure drive electrode 400-1 and the pressure receiving electrode 400-2 may be configured to detect the touch pressure in accordance with other principles and structures. For example, the pressure drive electrode 400-1 and the pressure receiving electrode 400-2 may be disposed apart from each other by a distance "d" in the touch input device 1000 such that the distance "d" is reduced with the increase of the touch pressure. Therefore, when the distance "d" is reduced, the magnitude of the capacitance which is formed between the pressure drive electrode 400-1 and the pressure receiving electrode 400-2 may be reduced.

Also, while one pair of the pressure drive electrode 400-1 and the pressure receiving electrode 400-2 is shown as the pressure electrode in FIG. 3b, the pressure electrode may include a plurality of pairs of the pressure drive electrode and the pressure receiving electrode. Here, each of the pairs of the pressure drive electrode and the pressure receiving electrode may include one channel. Therefore, the pressure electrode is configured to include the plurality of pairs of the pressure drive electrode and the pressure receiving electrode, so that a plurality of channels for detecting the pressure can be configured. As such, through the configuration of the pressure electrode including the plurality of channels, it is possible to detect the pressures of a plurality of simultaneous touches.

Also, as described below with reference to FIGS. 8 and 9, the pressure electrode 400 may include one electrode. Even in this case, it is clear that the pressure electrode 400 can be configured in such a way as to form a plurality of channels for detecting the pressure.

As described above, it is necessary to detect the change of the capacitance generated at the pressure electrode 400 in order to detect the touch pressure. Therefore, the drive signal needs to be applied to the pressure drive electrode 400-1, and the sensing signal is obtained from the pressure receiving electrode 400-2 and then the touch pressure should be calculated from the capacitance change amount. Here, if a touch sensing IC for detecting the pressure is manufactured separately from the drive unit 110 and the sensing unit 120 for the touch sensor panel 100, a configuration similar to the drive unit 110, the sensing unit 120, and the controller 130 is repeatedly included, so that the area and volume of the touch input device 1000 are increased. Therefore, the embodiment of the present invention provides a technology in which a touch detector 150 for the touch sensor panel 100 is used almost the same, and, through this, the touch pressure is also detected from the pressure electrode 400.

FIG. 4 is a conceptual view showing a signal transmission among the touch detector, the touch sensor panel, and the pressure electrode in accordance with the embodiment. As shown in FIG. 4, the touch detector 150 according to the embodiment may not only detect the touch position from the touch sensor panel 100 but also detect the touch pressure from the pressure electrode 400. For example, the touch detector 150 according to the embodiment may apply the drive signal to the drive electrode TX of the touch sensor panel 100 and receive the sensing signal from the receiving electrode RX, thereby detecting the touch position. Also, the touch detector 150 may apply the drive signal to the pressure electrode 400 and receive the sensing signal from the pressure electrode 400, thereby detecting the magnitude of the touch pressure. That is, in the embodiment, the touch detector 150 may be used, which has a common configuration not only for detecting the touch position from the touch sensor panel 100 but also for detecting the magnitude of the touch pressure from the pressure electrode 400.

FIG. 5 shows a touch detection chip according to the embodiment. As shown in FIG. 5, the touch detector 150 according to the embodiment may be constituted by one chip. The touch detector 150 according to the embodiment may be implemented by an integrated circuit (IC) formed by integrating the drive unit 110 and the sensing unit 120 which are included in the touch detector 150 on one chip. As shown in FIG. 5, the touch detection chip 150C may include a plurality of input/output terminals T. These input/output terminals T may be implemented by a pin. FIG. 5 shows that n number of drive signal output terminals T-TX1 to T-TXn, m number of sensing signal input terminals T-RX1 to T-RXm, one pressure drive signal output terminal T-TXP, and one pressure sensing signal input terminal T-RXP are included as the input/output terminals T in the touch detection chip 150C. FIG. 5 shows that one pressure drive signal output terminal T-TXP and one pressure sensing signal input terminal T-RXP are included. However, for example, when the pressure electrodes 400 is configured in such a way as to form a plurality of channels for detecting the pressure, the touch detection chip 150C may be configured to include a plurality of the pressure drive signal output terminals T-TXP and a plurality of the pressure sensing signal input terminals T-RXP. According to the embodiment, the touch detection chip 150C may further another input/output terminal. FIG. 5 shows that the touch detection chip 150C further includes a power voltage terminal T-VDD and a data output terminal T-DATA.

Also, according to the embodiment, when the touch position and/or touch pressure are detected through one electrode by a self-capacitance detection method without a separate drive electrode and a separate receiving electrode, it is possible to apply the drive signal to the one electrode and to receive the sensing signal from the one electrode through one input/output terminal without separately configuring an output terminal to which the drive signal is applied and an input terminal to which the sensing signal is received.

In FIG. 5, the drive signal may be applied to n number of the drive electrodes TX1 to TXn respectively through n number of drive signal output terminals T-TX1 to T-TXn of the touch detection chip 150C. The sensing signal may be inputted from m number of the receiving electrodes RX1 to RXm respectively through m number of sensing signal input terminals T-RX1 to T-RXm. Also, a pressure drive signal may be applied to the pressure electrode 400 through the pressure drive signal output terminal T-TXP, and a pressure sensing signal may be inputted from the pressure electrode 400 through the pressure sensing signal input terminal T-RXP.

FIG. 6 shows an equivalent circuit showing connection relationships among the drive unit, the sensing unit, and electrodes of the touch input device according to the embodiment. Referring to FIG. 6, the drive unit 110 of the touch detector 150 according to the embodiment may include, for example, a plurality of driving circuits 111 to 11n and 11n+1, and the sensing unit 120 may include, for example, a plurality of sensing circuits $120_1$ to $120m$ and $120m+1$. In FIG. 6, the upper part with respect to a line "S" shows a configuration for detecting the position of the touch on the touch sensor panel 100, and the lower part with respect to the line "S" shows a configuration for detecting the magnitude of the touch pressure from the pressure electrode 400.

The first to n-th driving circuits 111 to 11n may be connected to the plurality of drive electrodes TX1 to TXn respectively and transmit the drive signal. Here, the driving circuits 111 to 11n may include a clock generator and/or a digital/analog buffer.

The first to the m-th sensing circuits $120_1$ to $120m$ may obtain touch position information by detecting the capacitances of node capacitors C1m to Cnm. For convenience of description, FIG. 6 shows only that the capacitances of node capacitors C1m to Cnm which are transmitted through the m-th receiving electrode RXm are detected. Therefore, among the sensing circuits $120_1$ to $120m$ for detecting the touch position through the touch sensor panel 100, only the m-th sensing circuit $120m$ is shown. One end of the first node capacitor C1m is connected to the first driving circuit 111 through the first drive electrode TX1, and the other is connected to the m-th sensing circuit $120m$ through the m-th receiving electrode RXm. In the same manner, the second to the nth node capacitors C2m to Cnm may be connected to the drive unit 110 and the m-th sensing circuit $120m$.

Also, the m-th sensing circuit $120m$ may include a capacitance sensor including an amplifier $121m$ and a feedback capacitor $122m$. The feedback capacitor $122m$ is located between an inverting terminal of the amplifier $121m$ and the output terminal of the amplifier $121m$, that is, is connected to a feedback path. Here, a non-inverting terminal of the amplifier $121m$ may be connected to the ground or to a reference potential Vref Also, the capacitance sensor may further include a reset switch (not shown) which is connected in parallel to the feedback capacitor $122m$. The reset switch may reset the conversion between current and voltage, which is performed by the capacitance sensor. The inverting terminal of the amplifier $121m$ receives a current signal including information on the capacitances of the node capacitors C1m to Cnm through the receiving electrode RXm and integrates, and then converts the current signal into a voltage signal Vom. Data integrated by the capacitance sensor including the amplifier $121m$ and the feedback capacitor $122m$ may be converted into a digital data through an analog to digital converter (ADC) $123m$. In the future, the digital data may be inputted to a processor, etc., and be processed to obtain information on the touch position on the touch sensor panel 100.

In the touch detector 150 and/or the touch detection chip 150C according to the embodiment, a driving circuit, for example, the driving circuit 11n+1 (the n+1th driving circuit) among the plurality of driving circuits included in the drive unit 110 may be used to apply a drive signal Vsn+1 to the pressure drive electrode 400-1. Also, a sensing circuit, for example, the sensing circuit $120m+1$ among the plurality of sensing circuits included in the sensing unit 120 may detect, from the pressure drive electrode 400-1, the capacitance of the pressure capacitor 401 (Cp) generated between the pressure drive electrode 400-1 and the pressure receiving electrode 400-2, and thus, may detect the magnitude of the touch pressure. In FIG. 6, one driving circuit, for example, the driving circuit 11n+1 (the n+1th driving circuit) and one sensing circuit, for example, the sensing circuit $120m+1$ are shown as a driving circuit and a sensing circuit for the pressure detection. However, according to the embodiment, for instance, when a plurality of channels for detecting the pressure are formed, a plurality of driving circuits and a plurality of sensing circuits may be included as a driving circuit and a sensing circuit for the pressure detection.

FIG. 6 shows that the sensing circuits $120_1$ to $120m+1$ include the ADCs $123_1$ to $123m+1$ respectively. However, the sensing unit 120 may include one common ADC 123. Also, the data which is outputted from each of the sensing circuits $120_1$ to $120m+1$ can be outputted through one data output terminal T-DATA shown in FIG. 5. Here, a data signal from each of the sensing circuits $120_1$ to $120m+1$ may have different headers. Also, according to the embodiment, the data which is outputted from each of the sensing circuits $120_1$ to $120m+1$ can be also outputted through the different data output terminals T-DATA.

As shown in FIG. 6, the touch detector 150 according to the embodiment may further include the driving circuits 111 to 11n for detecting the touch position and at least one additional driving circuit 11n+1 for detecting the touch pressure, and may further include the sensing circuit $120m$ for detecting the touch position and at least one additional sensing circuit $120m+1$ or detecting the touch pressure. Here, the driving circuit 11n+1 for detecting the pressure may be configured substantially the same as the driving circuits 111 to 11n, and the sensing circuit $120m+1$ for detecting the pressure may be configured substantially the same as the sensing circuit $120m$. In the touch detector 150 and the touch detection chip 150C according to the embodiment, the touch detector and the touch detection chip for detecting the position of the touch on the touch sensor panel 100 are simply modified, so that the touch pressure as well as the touch position can be detected.

FIG. 7 shows a drive signal which is applied from the drive unit of the touch detector according to the embodiment to the electrodes. The controller 130 may control the drive unit 110 and the sensing unit 120 such that the application of the drive signal and the reception of the sensing signal to be described with reference to FIG. 7 are performed. The controller 130 according to the embodiment may be implemented to be integrated in the touch detection chip 150C.

For example, the drive unit 110 may sequentially apply a pulse-shaped drive signal to the first to the n-th drive electrodes TX1 to TXn in order to detect the touch position. For instance, the drive signal is applied to the first drive electrode TX1 in a first time interval (t1), and the drive signal is applied to the second drive electrode TX2 in a second time interval (t2). In the same manner, the drive signal is applied to the n-th drive electrode TXn in an n-th time interval (tn). Here, the sensing unit 120 detects the capacitances of the node capacitors C1m to Cnm through the receiving electrodes RX1 to RXm included in the touch sensor panel 100, thereby detecting the touch position and/or whether the touch has occurred or not.

Here, the drive unit 110 may apply the drive signal to the pressure drive electrode 400-1 (TXn+1 in FIG. 7) in the (n+1)-th time interval (tn+1, not shown), and the sensing unit 120 may detect the capacitance of the pressure capacitor 401 (Cp) from the pressure receiving electrode 400-2 (RXm+1 in FIG. 7) in the (n+1)-th time interval, so that the touch pressure is detected. In this case, from the viewpoint of the touch detector 150 and 150c, the pressure drive electrode 400-1 (TXn+1 in FIG. 7) and the pressure receiving electrode 400-2 (RXm+1 in FIG. 7) may be recognized to be the same as the drive electrode TX and the receiving electrode RX included in the touch sensor panel 100.

In the detection of the touch pressure through the touch detector 150 and 150c, in order to minimize noise and to increase the detection accuracy of the magnitude of the touch pressure, as shown in FIG. 7, for example, the drive unit 110 continuously applies the drive signal to the pressure drive electrode 400-1 (TXn+1 in FIG. 7) during the first time interval (t1) to the n-th time interval (tn+1). Here, the sensing unit 120 continuously detects the signal through the pressure receiving electrode 400-2 (RXm+1 in FIG. 7) during the first time interval (t1) to the n-th time interval (tn+1), and then the detected signal may be used to detect the pressure. For instance, the detected signal may be filtered by finite impulse response (FIR) and then used to detect the pressure. Also, according to the embodiment, an average value of the detected signal may be used to detect the pressure.

In this case, during the first time interval to the n-th time interval, the touch detector 150 may output n×m number of position detection data signals for detecting the touch position from the touch sensor panel 100 including n number of the drive electrodes TX1 to TXn and m number of the receiving electrodes RX1 to RXm and may output one pressure detection data signal for detecting the touch pressure from one pressure drive electrode TXn+1 and one pressure receiving electrode RXm+1. That is, since m number of the position detection receiving electrodes RX1 to RXm may output one position data signal in each time interval, n×m number of position data signals can be obtained for each scanning. At this time, one pressure detection data signal can be outputted.

The foregoing has described that the drive signal is sequentially applied to n number of the drive electrodes TX1 to TXn during the first time interval to the n-th time interval. However, according to the embodiment, the drive signal can be simultaneously applied to at least two of n number of the drive electrodes TX1 to TXn.

According to the embodiment, when the pressure electrode is configured to form a plurality of channels, it is clear that a plurality of the pressure detection data signals are outputted for each scanning. In this case, the drive signal may be sequentially applied to the plurality of pressure drive electrodes. The sequential application of the drive signal to the plurality of pressure drive electrodes may be performed after the drive signal is applied to the first to the n-th drive electrodes TX1 to TXn, or may be performed simultaneously when the drive signal is applied to the first to the n-th drive electrodes TX1 to TXn. Also, according to the embodiment, the drive signal can be simultaneously applied to at least two pressure drive electrodes.

FIGS. 8a to 8c show respectively an equivalent circuit of the pressure electrode and the sensing unit, a structure of the pressure electrode, and a graph showing an output signal of the sensing unit, based on a change of a distance between the pressure electrode and the reference potential layer in accordance with a first alternative example of the touch input device according to the embodiment.

For example, the pressure electrode 400 is, as shown in FIG. 8b, constituted by one electrode and is, as shown in FIG. 3, disposed within the touch input device 1000 in such a way as to be spaced apart from the reference potential layer 300 by a predetermined distance "d". In this case, as shown in FIG. 8b, the pressure capacitor 401 may be formed between the pressure electrode 400 and the reference potential layer 300. The value of the pressure capacitor 401 may be increased with the reduction of the distance "d". The touch detector 150 and 150C detects the change of the value of the pressure capacitor 401, thereby detecting the magnitude of the touch pressure.

As shown in FIG. 8a, in the first alternative example, the pressure capacitor 401 may be located between the pressure drive signal output terminal T-TXP for applying the drive signal Vsn+1 from the drive unit 110 to the pressure electrode 400 and the pressure sensing signal input terminal T-RXP for receiving the sensing signal from the pressure electrode 400. It may be shown that the pressure capacitor 401 is located between a connector 404 and the ground, i.e., the reference potential layer 300. Here, since the capacitance of the pressure capacitor 401 changes depending on the distance between the pressure electrode 400 and the reference potential layer 300, the pressure capacitor 401 is indicated to be variable.

In the first alternative example, in order to detect the touch pressure through the pressure capacitor 401, the pressure electrode 400 may be formed between a first impedance 402 and a second impedance 403. FIG. 8a shows that both the first impedance 402 and the second impedance 403 are pure capacitors C1 and C2. As shown in FIG. 8a, both the first impedance 402 and the second impedance 403 are configured with the capacitors, thereby providing a performance that the touch detector 150 does not depend on an operating frequency of the drive signal Vs.

Referring to FIG. 8a, it can be construed that the first impedance 402 and the second impedance 403 are formed between the drive unit 110 and the pressure electrode 400 and between the sensing unit 120 and the pressure electrode 400, respectively, and are formed outside the touch detector 150 and the touch detection chip 150C. For instance, the first impedance 402 and the second impedance 403 may be formed at the outside of the chip and formed on a conductive trace, etc., which connects the chip and the electrode. Here, the first impedance 402 and the second impedance 403 may be configured very close to the chip. However, this is just an example of the configuration, and it is possible that one or both of the first impedance 402 and the second impedance 403 are integrated on the chip where the touch detector has been integrated. The first impedance 402 and the second impedance 403 are implemented within the chip, so that additional external devices are not required and manufacturing cost can be reduced. When both of the first impedance 402 and the second impedance 403 are formed within the chip, the drive signal can be applied and the sensing signal can be received through one input/output terminal without separately forming the pressure drive signal output terminal T-TXP and the pressure sensing signal input terminal T-RXP. Also, the first impedance 402 and the second impedance 403 are connected to an electrode for detecting any pressure, thereby providing a uniform pressure detection performance.

In the first alternative example, referring back to FIG. 3, when a pressure is applied by the object 10 and the distance "d" between the pressure electrode 400 and the reference potential layer 300 is reduced, the capacitance of the pressure capacitor 401 is increased. A relationship between the output signal Vo of the capacitance sensor and the drive signal Vs may be represented by the following equation (1) with reference to the equivalent circuit of FIG. 8a.

$$v_o = -\left(\frac{C_1}{C_1 + C_2 + C_p}\right) \cdot \frac{C_2}{C_{FB}} \cdot v_s \qquad \text{equation (1)}$$

Referring to the equation (1), it can be understood that the output signal Vo has nothing to do with the frequency of the drive signal Vs. Here, when it is assumed that Cp»C1+C2, the equation (1) can be simplified as the following equation (2).

$$v_o = -\frac{C_1}{C_p} \cdot \frac{C_2}{C_{FB}} \cdot v_s \qquad \text{equation (2)}$$

$$v_o = -\frac{C_1 C_2}{\varepsilon A C_{FB}} \cdot d \cdot v_s$$

Here, Cp can be represented as $$C_p = \varepsilon \frac{A}{d}.$$

Here, "ε" represents a dielectric constant $\varepsilon_o \varepsilon_r$ of a material filled between the pressure electrode 400 and the reference potential layer 300, "A" represents the surface area of the pressure electrode 400, and "d" represents the distance between the pressure electrode 400 and the reference potential layer 300. In the equation (2), it can be seen that the output signal Vo changes linearly in proportion to the distance "d". It is apparent that the capacitances of Cp, C1 and C2 can change according to the embodiment/environment. A linear relationship between the output signal Vo and the distance "d" could be obtained by the result obtained by applying the capacitance of Cp in a range of hundreds of pico Farads (pF) and the capacitances of C1 and C2 in a range of several tens of pico Farads (pF).

FIG. 8c is a graph showing the output signal of the touch detector 150, which is based on the change of the distance between the pressure electrode 400 and the reference potential layer 300 of the pressure sensor according to the embodiment. The graph of FIG. 8c is obtained by removing offset or the like. Referring to FIG. 8c, as long as the change amounts of the distance d by the pressure are the same each other even when a deviation occurs in the absolute value of the capacitance of the pressure capacitor 401, it is discovered that the subsequent change amount of the output signal Vo can be constantly maintained. For example, the distance "d" between the pressure electrode 400 and the reference potential layer 300 may be changed depending on a first application P-1 and a second application P-2 to which the pressure electrode 400 is applied. However, in a case where the configuration according to the first alternative example is used, if the change amounts of the distance "d" between the pressure electrode 400 and the reference potential layer 300 are the same as each other (d1=d2) according to the applied pressure, the change amount of the output signal Vo can be substantially maintained the same (Vo1=Vo2). While FIG. 8c shows that the distance "d" and the output signal Vo have a perfect linear relationship with each other, this is just for convenience of description. According to the embodiment, the output signal Vo may be changed enough according to the distance "d" such that the distance "d" and the output signal Vo can be construed to have a substantial linear relationship.

FIG. 9 show an equivalent circuit of the pressure electrode and the sensing unit in accordance with a second alternative example of the touch input device according to the embodiment.

FIG. 9 shows an equivalent circuit between the drive signal Vs and the output signal Vo when a resistor R1 is used as the first impedance 402 in the first alternative example. The description of FIG. 9 is the same as that of FIG. 8a with the exception of the fact that the resistor R1 is used as the first impedance, and repetitive descriptions thereof will be omitted.

In the equivalent circuit of the second alternative example shown in FIG. 9, a transfer function between the drive signal Vs and the output signal Vo can be represented by the following equation (3).

$$v_o = -\left\{\frac{\frac{1}{j\omega}(C_2 + C_p)}{R_1 + \frac{1}{j\omega}(C_2 + C_p)}\right\} \cdot \frac{C_2}{C_{FB}} \cdot v_s \qquad \text{equation (3)}$$

Here, when it is assumed that Cp»C2, the equation (3) can be simplified as the following equation (4).

$$v_o = -\left(\frac{1}{1 + j\omega C_p R_1}\right) \cdot \frac{C_2}{C_{FB}} \cdot v_s \qquad \text{equation (4)}$$

Here, ω=2πf and "f" is a frequency of the drive signal Vs. As can be seen from the equation (4), the magnitude of the output signal Vo is reduced with the increase of the frequency of the drive signal Vs.

Here, according to the equation (4), even though the linear relationship is not completely formed between the output signal Vo and the distance "d", an almost linear characteristic is formed between the output signal Vo and the distance "d" at a fixed frequency. Therefore, in the entire system according to the embodiment, as with the first example, the signal processing can be simplified. While in the foregoing description, the example has been provided in which the first impedance 402 is a resistive component and the second impedance 403 is a capacitive component, it can be also considered that the first impedance 402 is a capacitive component and the second impedance 403 is a resistive component.

As described with reference to FIG. 9, when at least any one of the first impedance 402 and the second impedance 403 is a resistive component instead of a pure capacitor, the output signal of which the characteristic is changed according to the frequency of the drive signal Vs is obtained.

It is apparent that the capacitances of Cp and C2 are changed according to the embodiment/environment. A linear relationship between the output signal Vo and the distance "d" and the characteristics that are changed according to the frequency could be obtained by the result obtained by applying the capacitance of Cp in a range of hundreds of pico Farads (pF) and the capacitance of C2 in a range of several tens of pico Farads (pF).

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A touch detection chip comprising:
   a drive unit which applies a drive signal to at least two of a plurality of electrodes;
   a sensing unit which receives a plurality of signals from the at least two of the plurality of electrodes and detects a touch position and a touch pressure; and
   a plurality of input terminals for receiving the plurality of signals,
      wherein the plurality of input terminals comprise at least one pressure detection input terminal for detecting the touch pressure and at least one position detection input terminal for detecting the touch position, the at least one pressure detection input terminal being different from the at least one position detection input terminal,
   wherein the at least two electrodes to which the drive signal is applied comprise at least one pressure detection drive electrode and n number of position detection drive electrodes,
   wherein the at least two electrodes for receiving the plurality of signals comprise at least one pressure detection receiving electrode and m number of position detection receiving electrodes,
   wherein the drive unit applies the drive signal to n number of the position detection drive electrodes during a predetermined time interval and applies the drive signal to the at least one pressure detection drive electrode during the predetermined time interval,
   wherein the sensing unit comprises an amplifier and a feedback capacitor connected between an output terminal and a negative input terminal of the amplifier,
   and wherein the sensing unit outputs, during the predetermined time interval, n×m number of touch position data detected from m number of the position detection receiving electrodes and at least one touch pressure data detected from the at least one pressure detection receiving electrode.

2. The touch detection chip of claim 1,
   wherein at least one of the at least two electrodes to which the drive signal is applied is a pressure detection drive electrode,
   and wherein at least one of the at least two electrodes for receiving the plurality of signals is a pressure detection receiving electrode.

3. The touch detection chip of claim 2,
   further comprising a plurality of output terminals for applying the drive signal to the at least two electrodes to which the drive signal is applied,
   wherein at least one of the plurality of output terminals is a pressure detection output terminal for applying the drive signal to the pressure detection drive electrode.

4. The touch detection chip of claim 2,
   wherein the pressure detection drive electrode and the pressure detection receiving electrode are the same pressure detection electrode,
   wherein the sensing unit receives, through the at least one pressure detection input terminal, a signal comprising information on a capacitance between the pressure detection electrode and a reference potential layer, which changes depending on a relative distance between the pressure detection electrode and the reference potential layer spaced apart from the pressure detection electrode,
   and wherein the drive signal which is applied to the pressure detection electrode passes through a first impedance located between the drive unit and the pressure detection electrode and then is applied to the pressure detection electrode, and wherein the signal which is received from the pressure detection electrode passes through a second impedance located between the sensing unit and the pressure detection electrode and then is received by the sensing unit.

5. The touch detection chip of claim 3,
   wherein the pressure detection drive electrode and the pressure detection receiving electrode are the same pressure detection electrode,
   wherein the sensing unit receives, through the at least one pressure detection input terminal, a signal comprising information on a capacitance between the electrode and a reference potential layer, which changes depending on a relative distance between the pressure detection electrode and the reference potential layer spaced apart from the pressure detection electrode,
   and further comprising a first impedance between the drive unit and the pressure detection output terminal and a second impedance between the sensing unit and the at least one pressure detection input terminal.

6. The touch detection chip of claim 4, wherein the first impedance and the second impedance are capacitive components.

7. The touch detection chip of claim 1,
   wherein the at least two electrodes to which the drive signal is applied comprise at least one pressure detection drive electrode and n number of position detection drive electrodes (n is an integer greater than or equal to 1),
   wherein the at least two electrodes for receiving the plurality of signals comprise at least one pressure detection receiving electrode and m number of position detection receiving electrodes (m is an integer greater than or equal to 1), and
   wherein the drive unit applies the drive signal to the n number of the position detection drive electrodes during a predetermined time interval and applies the drive signal to the at least one pressure detection drive electrode during a different time interval from the predetermined time interval.

8. A touch detector comprising:
   a drive unit which applies a drive signal to at least two of a plurality of electrodes; and
   a sensing unit which receives a plurality of signals from the at least two of the plurality of electrodes and detects a touch position and a touch pressure,
   wherein the at least two electrodes to which the drive signal is applied comprise at least one pressure detection drive electrode for detecting the touch pressure only, and wherein the at least two electrodes for receiving the plurality of signals comprise at least one pressure detection receiving electrode for detecting the touch pressure only, wherein the at least two electrodes to which the drive signal is applied comprise the at least one pressure detection drive electrode and n number of position detection drive electrodes, wherein the at least two electrodes for receiving the plurality of signals comprise the at least one pressure detection receiving electrode and m number of position detection receiving electrodes, wherein the drive unit applies the drive signal to n number of the position detection drive electrodes during a predetermined time interval and applies the drive signal to the at least one pressure detection drive electrode during the predetermined time interval, wherein the sensing unit comprises an amplifier and a feedback capacitor connected between an output terminal and a negative input terminal of the amplifier, and wherein the sensing unit outputs, during the predetermined time interval, n×m number of touch position data detected from m number of the position detection receiving electrodes and at least one touch pressure data detected from the at least one pressure detection receiving electrode.

9. The touch detector of claim 8, wherein the at least one pressure detection drive electrode and the at least one pressure detection receiving electrode are the same pressure detection electrode, wherein the sensing unit receives a signal comprising information on a capacitance between the pressure detection electrode and a reference potential layer, which changes depending on a relative distance between the pressure detection electrode and the reference potential layer spaced apart from the pressure detection electrode, and wherein the drive signal which is applied to the pressure detection electrode passes through a first impedance located between the drive unit and the pressure detection electrode and then is applied to the pressure detection electrode, and wherein the signal which is received from the pressure detection electrode passes through a second impedance located between the sensing unit and the pressure detection electrode and then is received by the sensing unit.

10. The touch detector of claim 9, wherein the first impedance and the second impedance are capacitive components.

11. the touch detector of claim 8, wherein the at least two electrodes to which the drive signal is applied further comprise n number of position detection drive electrodes (n is an integer greater than or equal to 1), wherein the at least two electrodes for receiving the plurality of signals further comprise m number of position detection receiving electrodes (m is integer greater than or equal to 1), and wherein the drive unit applies the drive signal to the n number of the position detection drive electrodes during a predetermined time interval and applies the drive signal to the at least one pressure detection drive electrode during a different time interval from the predetermined time interval.

12. A touch input device comprising:
a plurality of electrodes; and
a touch detection chip, wherein the touch detection chip comprises:
a drive unit which applies a drive signal to at least two of the plurality of electrodes;
a sensing unit which receives a plurality of signals from the at least two of the plurality of electrodes and detects a touch position and a touch pressure; and
a plurality of input terminals for receiving the plurality of signals, wherein the plurality of input terminals comprise at least one pressure detection input terminal for detecting the touch pressure and at least one position detection input terminal for detecting the touch position, the at least one pressure detection input terminal being different from the at least one position detection input terminal, wherein the at least two electrodes to which the drive signal is applied comprise at least one pressure detection drive electrode and n number of position detection drive electrodes, wherein the at least two electrodes for receiving the plurality of signals comprise at least one pressure detection receiving electrode and m number of position detection receiving electrodes, wherein the drive unit applies the drive signal to n number of the position detection drive electrodes during a predetermined time interval and applies the drive signal to the at least one pressure detection drive electrode during the predetermined time interval, wherein the sensing unit comprises an amplifier and a feedback capacitor connected between an output terminal and a negative input terminal of the amplifier, and wherein the sensing unit outputs, during the predetermined time interval, n×m number of touch position data detected from m number of the position detection receiving electrodes and at least one touch pressure data detected from the at least one pressure detection receiving electrode.

13. The touch input device of claim 12, wherein at least one of the at least two electrodes to which the drive signal is applied is a pressure detection drive electrode, and wherein at least one of the at least two electrodes for receiving the plurality of signals is a pressure detection receiving electrode.

14. The touch input device of claim 13, further comprising a plurality of output terminals for applying the drive signal to the at least two electrodes to which the drive signal is applied, wherein at least one of the plurality of output terminals is a pressure detection output terminal for applying the drive signal to the pressure detection drive electrode.

15. The touch input device of claim 14, wherein the pressure detection drive electrode and the pressure detection receiving electrode are the same pressure detection electrode, wherein the sensing unit receives, through the at least one pressure detection input terminal, a signal comprising information on a capacitance between the pressure detection electrode and a reference potential layer, which changes depending on a relative distance between the pressure detection electrode and the reference potential layer spaced apart from the pressure detection electrode, and further comprising a first impedance between the drive unit and the pressure detection output terminal and a second impedance between the sensing unit and the at least one pressure detection input terminal.

16. The touch input device of claim 13,
wherein the pressure detection drive electrode and the pressure detection receiving electrode are the same pressure detection electrode,
wherein the sensing unit receives, through the at least one pressure detection input terminal, a signal comprising information on a capacitance between the pressure detection electrode and a reference potential layer, which changes depending on a relative distance between the pressure detection electrode and the reference potential layer spaced apart from the pressure detection electrode,
and wherein the drive signal which is applied to the pressure detection electrode passes through a first impedance located between the drive unit and the pressure detection electrode and then is applied to the pressure detection electrode, and wherein the signal which is received from the pressure detection electrode passes through a second impedance located between the sensing unit and the pressure detection electrode and then is received by the sensing unit.

17. The touch input device of claim 16, wherein the first impedance and the second impedance are capacitive components.

18. The touch input device of claim 12,
wherein the at least two electrodes to which the drive signal is applied comprise at least one pressure detection drive electrode and n number of position detection drive electrodes (n is an integer greater than or equal to 1),
wherein the at least two electrodes for receiving the plurality of signals comprise at least one pressure detection receiving electrode and m number of position detection receiving electrodes (m is an integer greater than or equal to 1), and
wherein the drive unit applies the drive signal to the n number of the position detection drive electrodes during a predetermined time interval and applies the drive signal to the at least one pressure detection drive electrode during a different time interval from the predetermined time interval.

\* \* \* \* \*